United States Patent

Sato

Patent Number: 5,170,280
Date of Patent: Dec. 8, 1992

[54] MONOCHROMATOR
[75] Inventor: Tatsumi Sato, Otokunigun, Japan
[73] Assignee: Shimadzu Corporation, Kyoto, Japan
[21] Appl. No.: 764,443
[22] Filed: Sep. 24, 1991
[30] Foreign Application Priority Data
Sep. 29, 1990 [JP] Japan ................. 2-262580
[51] Int. Cl.[5] .............. G01J 3/04; G01J 3/12
[52] U.S. Cl. ................. 359/232; 359/722; 359/894
[58] Field of Search ........... 359/232, 894, 722, 652
[56] References Cited
U.S. PATENT DOCUMENTS

| | | | |
|---|---|---|---|
| 3,708,227 | 1/1973 | Krakow et al. .............. | 359/232 X |
| 4,082,461 | 4/1978 | Mould .......................... | 359/232 X |
| 4,902,084 | 2/1990 | Aharon ........................ | 359/894 X |
| 5,059,013 | 10/1991 | Jain .............................. | 359/894 X |

Primary Examiner—Eugene R. LaRoche
Assistant Examiner—Do Hyun Yoo
Attorney, Agent, or Firm—Oliff & Berridge

[57] ABSTRACT

An entrance slit and exit slit of a monochromator is shaped so that the width of the slits becomes smaller from the center towards the ends of their height, where the width is a dimension in the direction of the separation of the light in the monochromator. An example of such shape is rhombic. When the total amount of light emitted from the monochromator and the resolution of the monochromator are set to be the same, the efficiency of light in measuring small samples is increased and the ratio of stray light in the light emitted from the monochromator becomes smaller.

5 Claims, 2 Drawing Sheets

Fig. 3A
$h(\lambda)$
$\frac{w \cdot H}{2}$
$-w$  $w$
Fig. 3B
PRIOR ART
$a \cdot b$
$-a$  $a$
Fig. 4
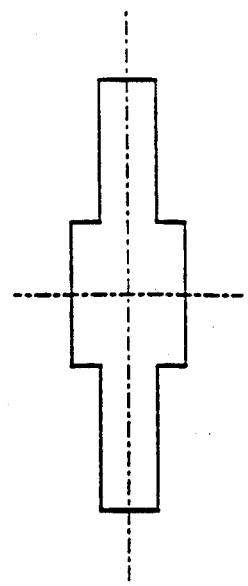
Fig. 5
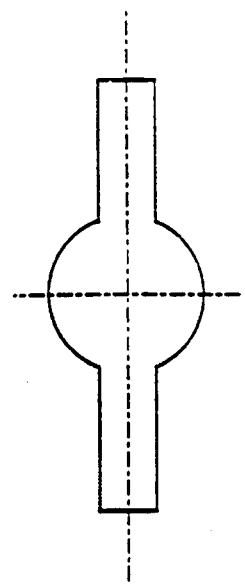

MONOCHROMATOR

The present invention relates to a monochromator, which is used in a spectrophotometer or other measurement apparatus.

BACKGROUND OF THE INVENTION

A monochromator includes an entrance slit plate having an entrance slit, a light separator (such as a diffraction grating, a prism, etc.), and an exit slit plate having an exit slit. Light coming into a monochromator through the entrance slit is separated (or dispersed) by the light separator into a series of component monochromatic lights, and an image of the entrance slit of every component monochromatic light is projected onto the exit slit plate. Thus a monochromated light of varying wavelength comes out of the exit slit while the monochromator scans through a preset range of wavelength.

In conventional monochromators, the entrance and exit slits are both rectangular long in the direction perpendicular to the direction of the separation of light (the direction of the separation of light is hereinafter referred to as the lateral direction). A spectrophotometer that uses a monochromator equipped with slits of such shape has the following problem.

When a sample is measured in a spectrophotometer, a bundle of light coming out of the exit slit of the monochromator is focused onto the sample where an image of the exit slit is formed, as shown in FIG. 1B. Thus the bundle of light 11 for measuring the sample 12 is shaped rectangular bearing the shape of the exit slit. When an ordinary box sample cell is used with an enough amount of sample in it, it is possible to set all the measurement light pass through the sample. When a flow sample cell is used or when a small-sized sample or small amount of sample is measured, however, it occurs that only a part of the measurement light can pass through the sample. Thus the efficiency of light in the measurement becomes low, since, as shown in FIG. 1B, the part 13 of the measurement light 11 external of the sample 12 is not used for the measurement.

SUMMARY OF THE INVENTION

A monochromator of the present invention achieved for solving the above-mentioned problem is constructed as follows:

the entrance and exit slits are shaped so that the width of the slits becomes smaller towards the both ends of their height (where the width is the dimension in the lateral direction).

An example of such shape is shown in FIG. 1A in which the slit is shaped rhombic. When compared to the conventional shape shown in FIG. 1B, it is apparent that the efficiency of light is greater in FIG. 1A, where a larger amount of light is projected on a small sample 12 and less amount of light 13 is wasted than the light emitted from the conventional rectangular slit. This comparison is made under the condition that: a) brightness of the monochromator (i.e., total amount of the measurement light emitted from the exit slit) is the same, and b) the resolution of the monochromator is the same. The working principle of the present invention is described in detail in the following description of preferred embodiments.

BRIEF DESCRIPTION OF THE ATTACHED DRAWINGS

FIG. 3A is a graph showing a spectrum peak of a monochromatic light emitted from the rhombic slit.

FIG. 3B is a graph showing a spectrum peak of a monochromatic light emitted from the conventional rectangular slit.

FIG. 4 is another slit embodying the present invention.

FIG. 5 is still another slit embodying the present invention.

DETAILED DESCRIPTION OF PREFERRED EMBODIMENTS

Figure 1A:
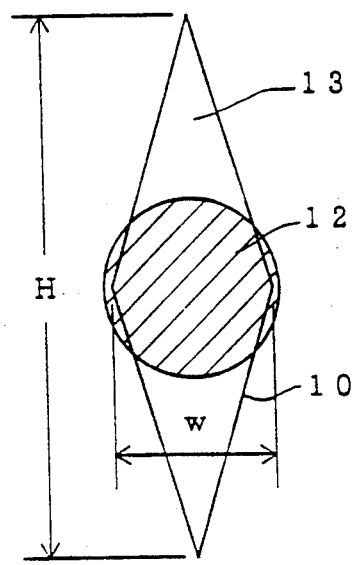
FIG. 1A is a diagram showing an image of a rhombic slit embodying the present invention projected on a small sample.
Figure 1B:
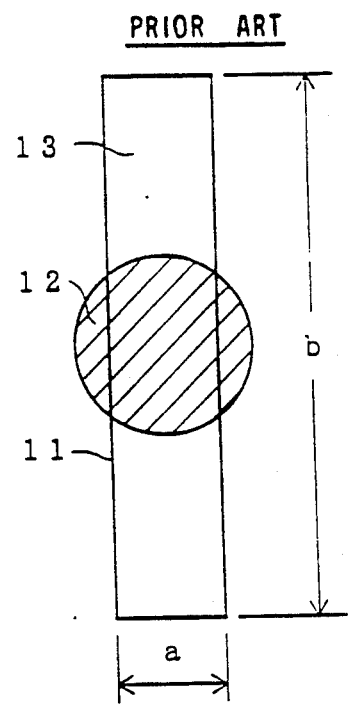
FIG. 1B is a diagram showing an image of a conventional rectangular slit projected on a small sample.

The first embodiment of the present invention is a monochromator equipped with an entrance and an exit slit shaped rhombic as shown in FIG. 1A. In monochromators, the entrance slit and the exit slit have the same shape since the image of the entrance slit is emitted from the exit slit. The effect of the rhombic shape of the slits is now described in comparison with that of the rectangular shape of the conventional slits as shown in FIG. 1B.

Figure 2A:
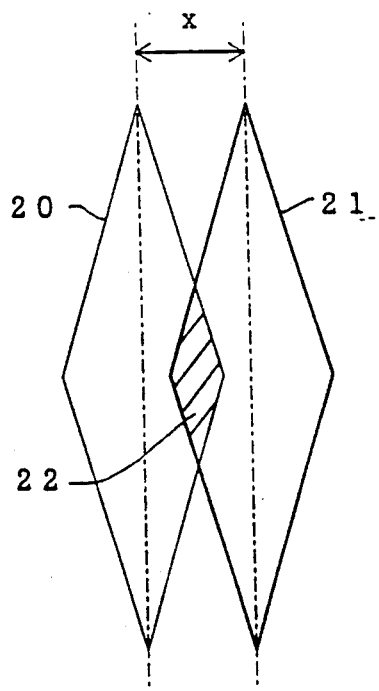
FIG. 2A is a diagram showing the image of the rhombic entrance slit overlapping the rhombic exit slit.
Figure 2B:
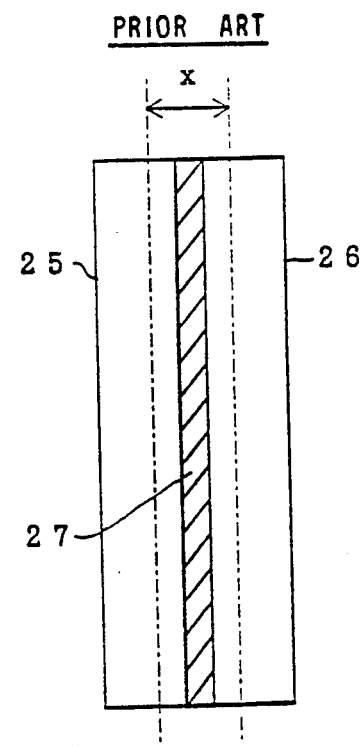
FIG. 2B is a diagram showing the image of the rectangular entrance slit overlapping the rectangular exit slit.

When a monochromatic light enters through the entrance slit into the monochromator and the wavelength scanning is made by the monochromator, an image of the entrance slit moves on the exit slit plate in the lateral direction. When the image of the entrance slit moves in the lateral direction, it passes over the exit slit, and the portion 22, 27 of the image 20, 25 of the entrance slit overlapping the exit slit 21, 26 is emitted from the monochromator as shown in FIGS. 2A and 2B. Thus the amount of light emitted from the monochromator is proportional to the area of the overlapping portion 22, 27. The area increases parabolically in the case of the rhombic slits (FIG. 2A) and linearly in the case of the rectangular slits (FIG. 2B) as the distance x between the image of the entrance slit 20, 25 and the exit slit 21, 26 decreases to zero (at which the image 20, 25 and the exit slit 21, 26 coincide).

The change in the amount of light emitted from the monochromator versus the distance x is shown in FIGS. 3A and 3B. Since the image 20, 25 is made of a monochromatic light, these graphs show a spectrum peak of a monochromatic light emitted from the exit slit. In FIGS. 3A and 3B, the peak position of the spectrum peak curve is set at zero for the convenience of the explanation. Actual peak position of a monochromatic light having wavelength $_o$ is at the wavelength $_o$.

The shape of the spectrum peak of FIG. 3A (by the rhombic slits) is formulated as follows:

$$h(\lambda) = (w - |\lambda|)^2 \cdot H/(2 \cdot w) \quad (-w < \lambda < w) \quad (1)$$
$$= 0 \quad (\lambda \leq -w, \lambda \geq w)$$

The shape of the spectrum peak of FIG. 3B (by the rectangular slits) is formulated as follows:

$$h(\lambda) = -b \cdot |\lambda| + a \cdot b \quad (-a < \lambda < a) \quad (2)$$
$$= 0 \quad (\lambda \leq -a, \lambda \geq a)$$

The resolution of the monochromator depends on the width of the slits. Since the resolution is normally defined by the halfvalue width of the spectrum peak, the relationship between the width w of the rhombic slit (FIG. 1A) and the width a of the rectangular slit (FIG. 1B) for obtaining the same resolution is:

$$w = a/(2-\sqrt{2}) \approx 1.7 \cdot a, \quad (3)$$

which is deduced from the equations (1) and (2) by equalizing the halfvalue widths of the spectrum peaks of FIGS. 3A and 3B.

For obtaining the same brightness (amount of light emitted from the monochromator) with the resolution maintaining the same, the relationship between the height H of the rhombic slit and the height b of the rectangular slit is:

$$H = 3 \cdot (2-\sqrt{2})^2 \cdot b \approx b. \quad (4)$$

which is deduced from the equations (1) and (2) by equalizing the areas of the spectrum peaks of FIGS. 3A and 3B.

Equations (3) and (4) show that the width of the rhombic slit is 1.7 times, and the height is approximately the same, as those of the rectangular slit for obtaining the same resolution and the same brightness. Thus, as seen by comparing FIGS. 1A and 1B, the light emitted from the rhombic slit 10 ca cover larger part of a small sample 12 than that emitted from the conventional rectangular slit 11. That is, by using a measurement light produced by the monochromator of the present embodiment, a greater efficiency of light can be achieved in a measurement using a flow sample cell or when a small sample is measured.

Next the stray light is considered. The amount of stray light in a monochromator is proportional to the amount of light entering into the monochromator through the entrance slit, i.e, proportional to the area of the entrance slit. Since the stray light disperses uniformly within the monochromator, the amount of stray light emitted from the exit slit is further proportional to the area of the exit slit. Therefore the amount of stray light emitted from the monochromator is proportional to the product of the areas of the entrance slit and the exit slit. The important thing about the stray light is not its absolute amount but the relative amount (ratio) C among the light emitted from the monochromator. For the rhombic slit of FIG. 1A, the ratio $C_A$ is:

$$C_A = \{w^2 \cdot H^2)/4\}/\{w^2 \cdot H)/3\} = (\tfrac{3}{4}) \cdot H,$$

and for the rectangular slit of FIG. 1B, the ratio $C_B$ is:

$$C_B = (a \cdot b)^2/(a^2 \cdot b) = b,$$

where ($a^2 \cdot b$) is the amount of light emitted from the monochromator.

If the amount of emitted light and the resolution are assumed to be equal, the ratios $C_A$ and $C_B$ of the two types of slits have the relation:

$$CA/CB = \tfrac{3}{4} \quad (5)$$

since $H \approx b$ as described above. Equation (5) means that the ratio of stray light in the light emitted from the monochromator is reduced to $\tfrac{3}{4}$ if the rhombic slits are used. Thus the S/N (signal to noise) ratio of the spectrophotometer using the monochromator of the present embodiment is increased, and the sensitivity and accuracy of the measurements by the spectrophotometer is improved.

In the above explanation of the comparison of the stray light, the two types of slits are compared assuming the same levels of brightness and resolution. If, on the other hand, the same resolution and same stray light level are assumed, the brightness of the monochromator of the present embodiment can be larger than the conventional monochromators, or, if the same brightness and the same stray light level are assumed, higher resolution can be obtained.

The narrowing manner of the width of the slit according to the present invention is not limited to the example as shown in FIG. 1A. The width can be reduced stepwise from the center to the ends as shown in FIGS. 4 and 5, and the same arguments as above applies to any slits embodying the present invention as long as the width narrows towards the ends.

What is claimed is:

1. A monochromator for receiving composite light from an entrance slit, separating the composite light in a wavelength separation direction into a series of monochromatic lights and emitting a monochromatic light from an exit slit, the monochromator including an entrance slit and an exit slit shaped so that a width of each slit is smaller at each end of the slit than at a center of the slit, the width being a dimension oriented in the wavelength separation direction.

2. A monochromator, as claimed in claim 1, where the entrance and exit slits are shaped rhombic with a shorter diagonal parallel to the wave-length separation direction.

3. A monochromator, as claimed in claim 1, where the entrance and exit slits are shaped in a composite shape including a rectangular shape having a long dimension in a height direction perpendicular to the wavelength separation direction and a widthwise bulge at a center of the rectangular shape.

4. A monochromator, as claimed in claim 3, where the widthwise bulge is shaped rectangular.

5. A monochromator, as claimed in claim 3, where the widthwise bulge is shaped circular.

* * * * *